Aug. 9, 1966    M. G. W. THATCHER, JR    3,265,155
EXTENSIBLE LADDER AND SUPPORT
Filed Dec. 5, 1963    5 Sheets-Sheet 2
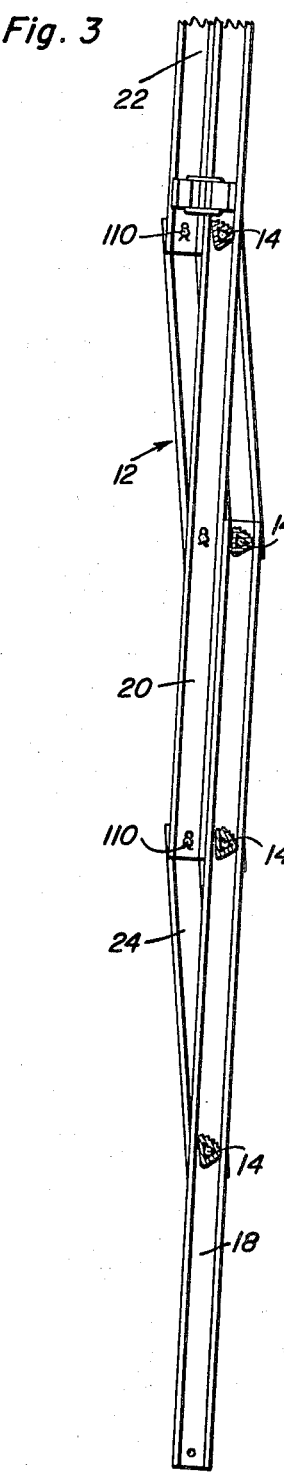
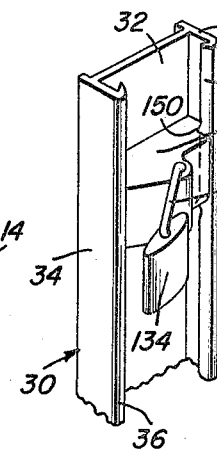
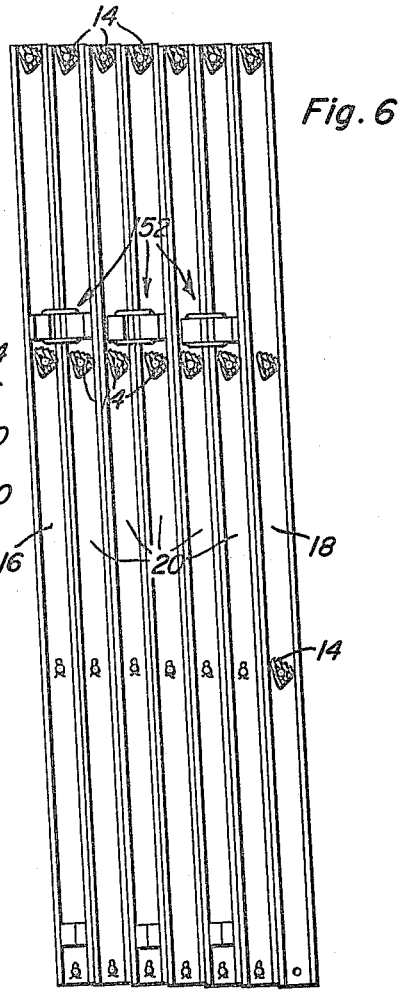
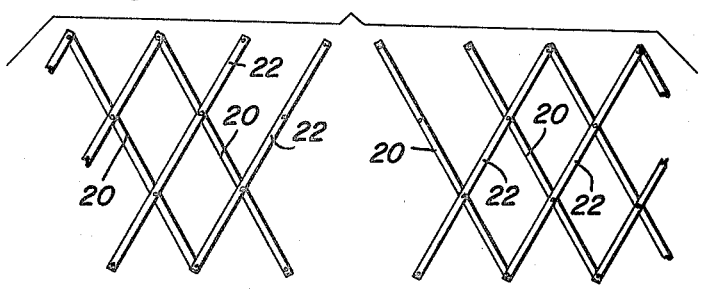
Melville G.W. Thatcher, Jr.
INVENTOR.
BY Clarence A. O'Brien
and Harvey B. Jackson
Attorneys Aug. 9, 1966     M. G. W. THATCHER, JR     3,265,155
EXTENSIBLE LADDER AND SUPPORT
Filed Dec. 5, 1963     5 Sheets-Sheet 3
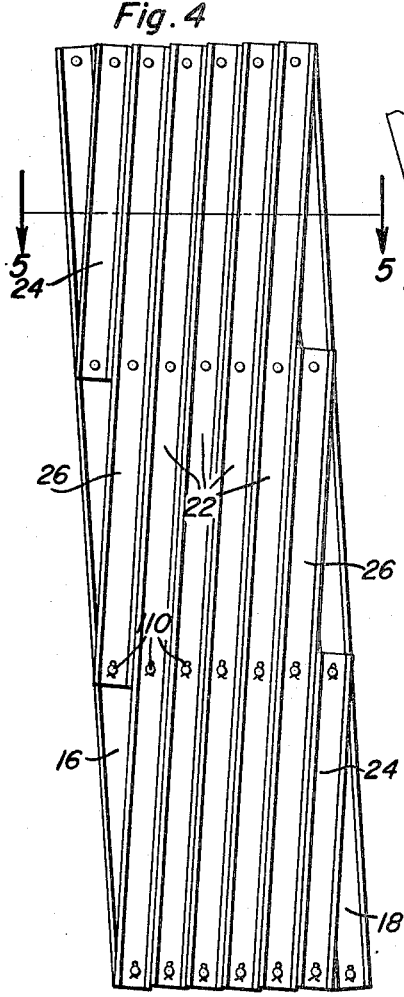
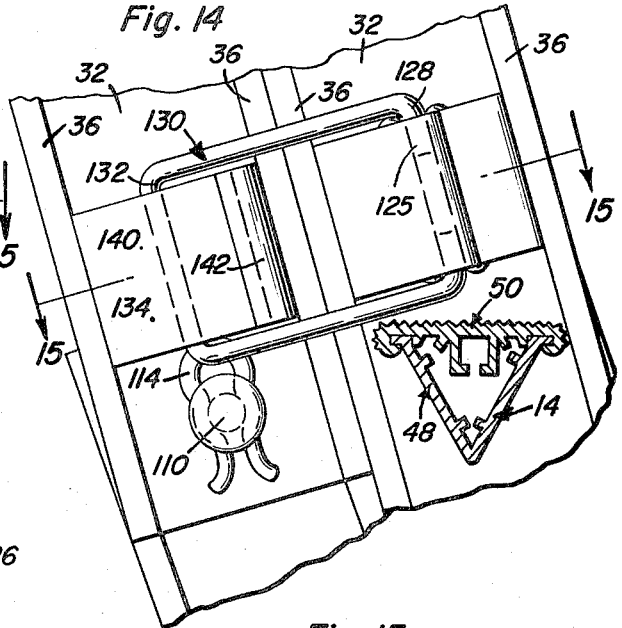
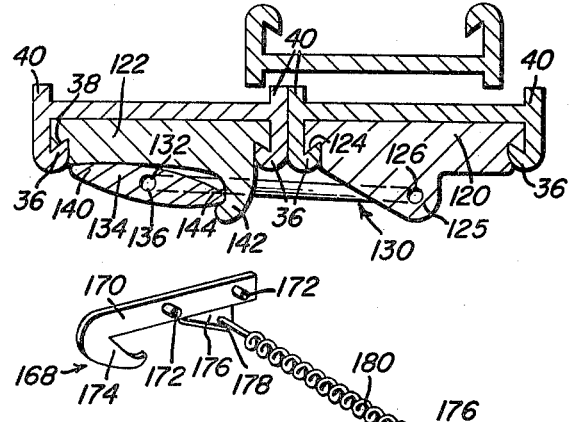
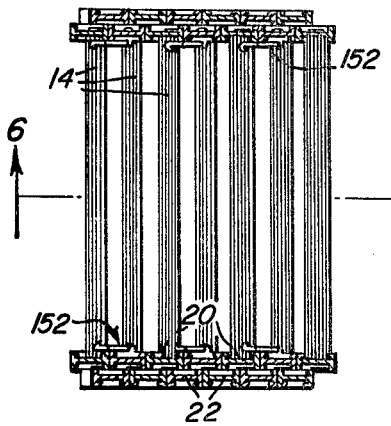
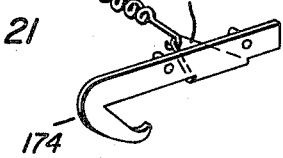
Melville G. W. Thatcher, Jr.
*INVENTOR.*

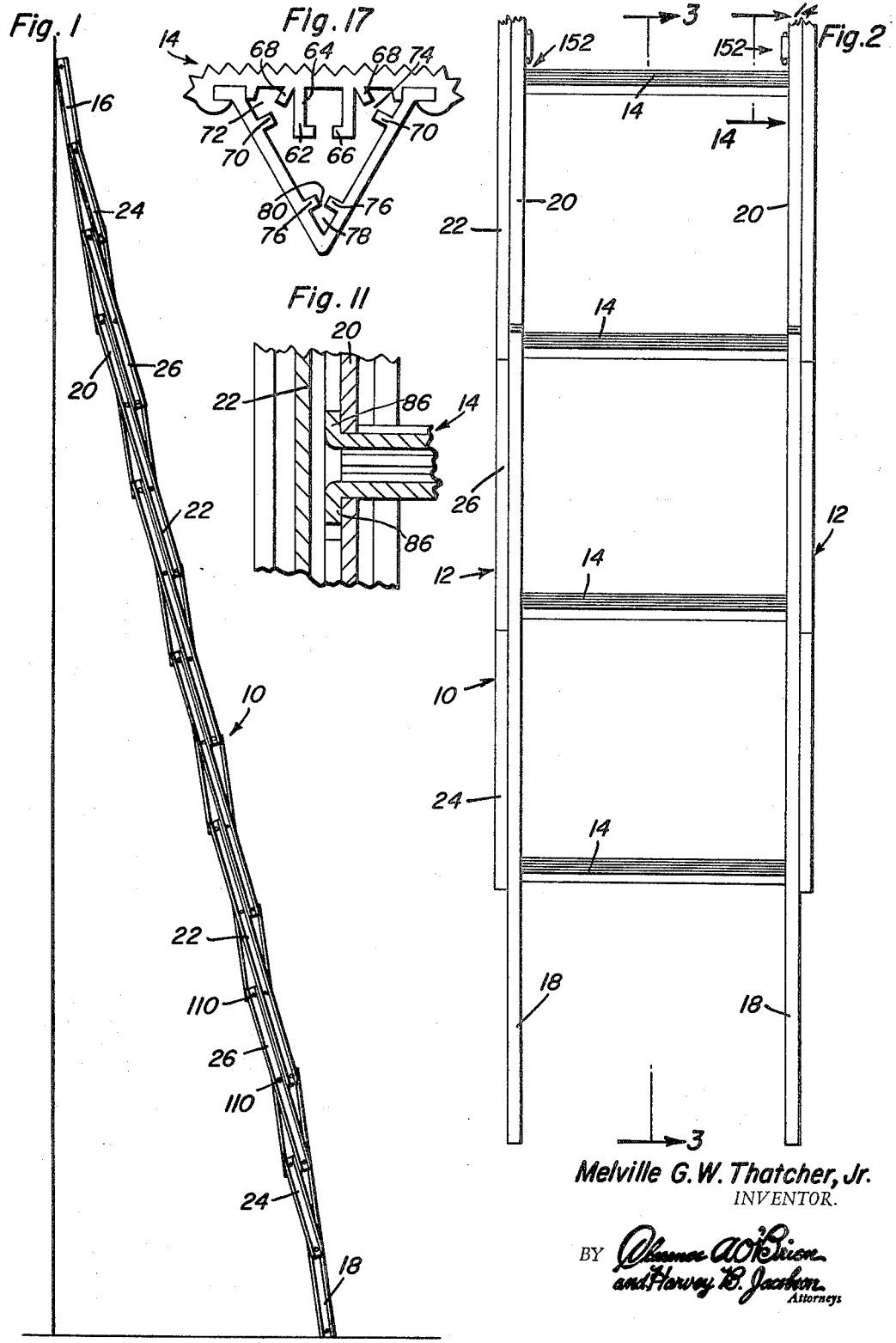

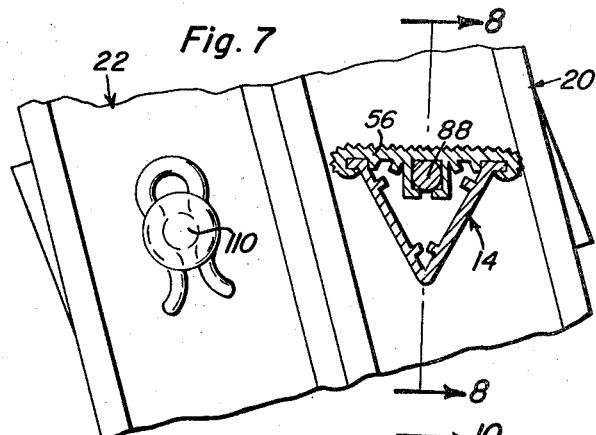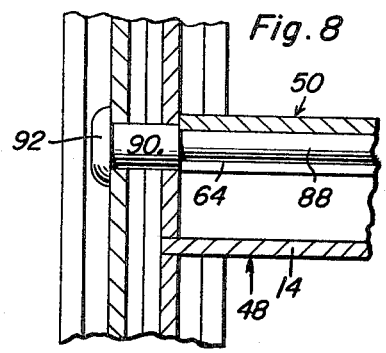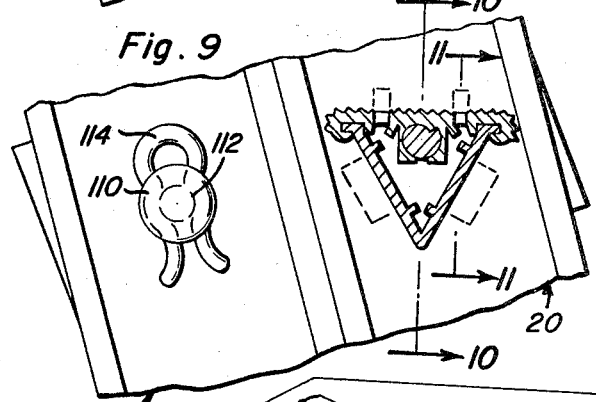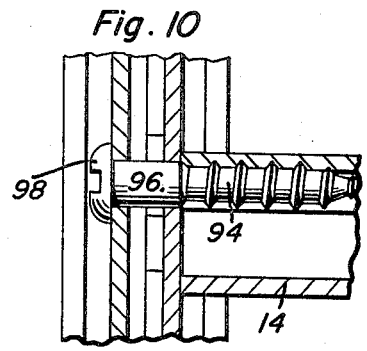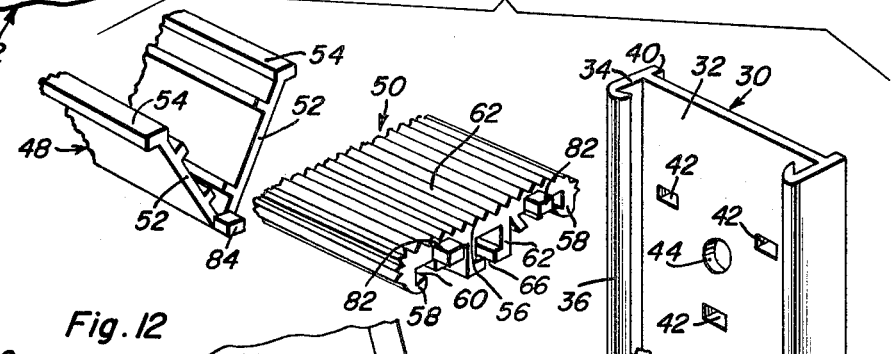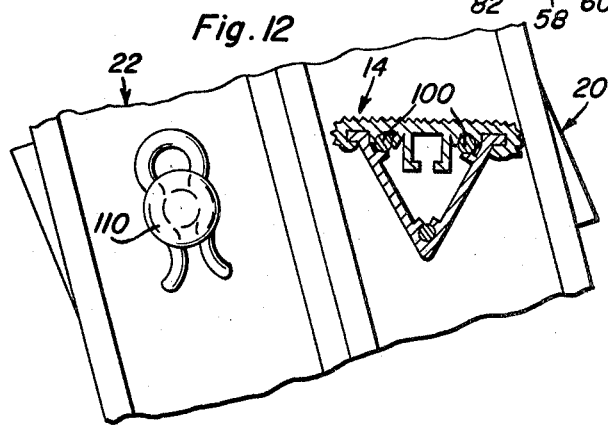

Aug. 9, 1966  M. G. W. THATCHER, JR  3,265,155
EXTENSIBLE LADDER AND SUPPORT
Filed Dec. 5, 1963  5 Sheets-Sheet 5
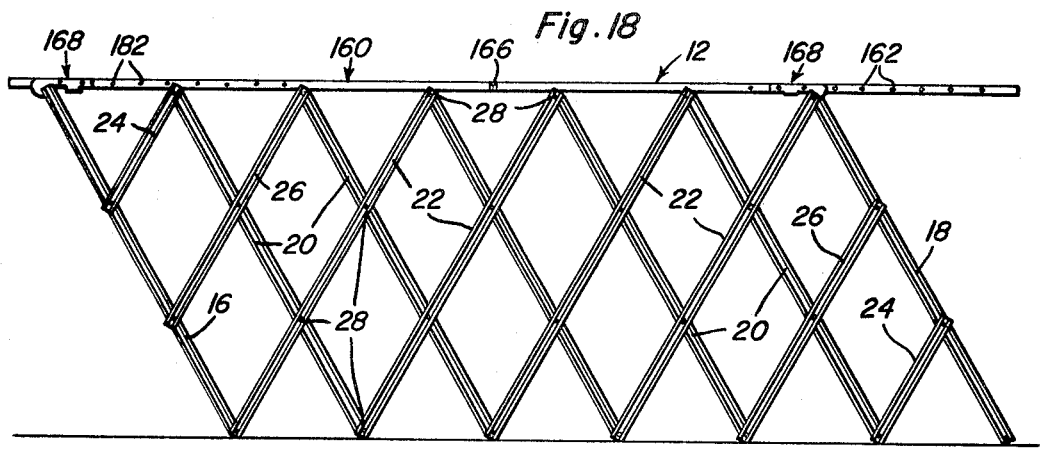
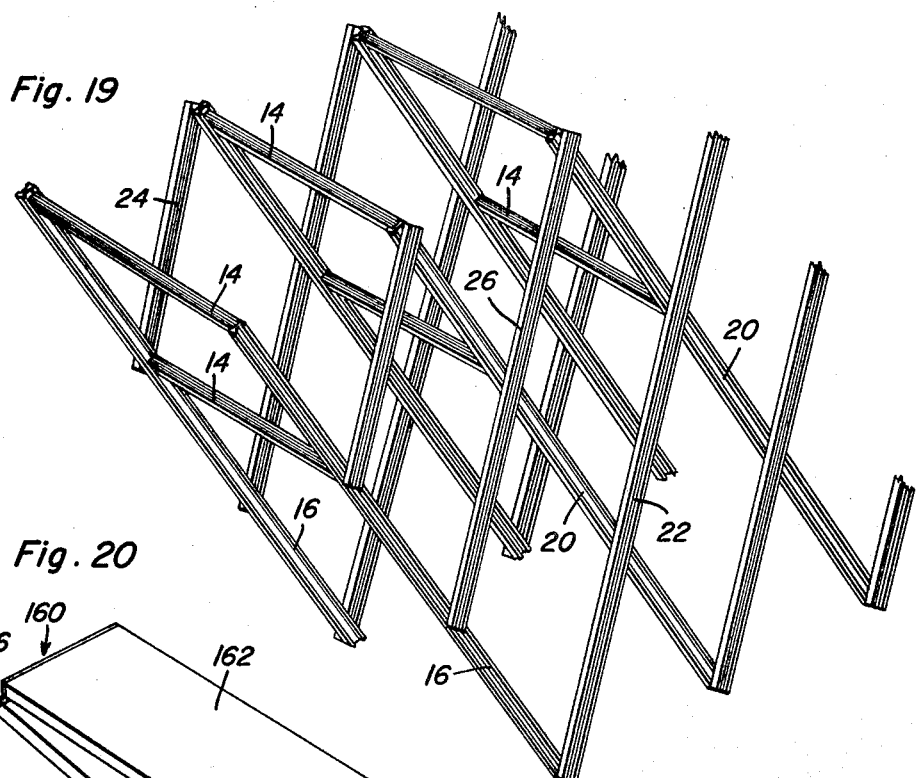
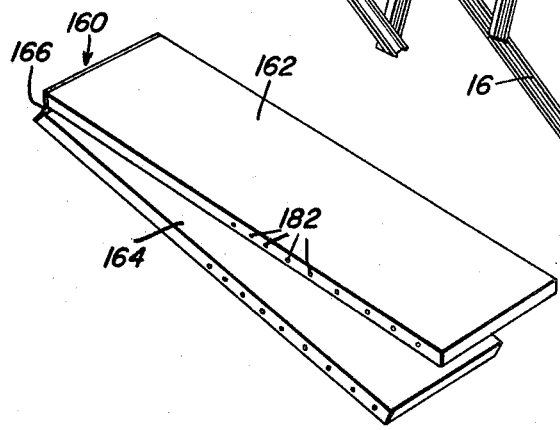
Melville G. W. Thatcher, Jr.
INVENTOR.
BY *Clarence A. O'Brien*
*and Harvey B. Jacobson*
Attorneys 3,265,155
EXTENSIBLE LADDER AND SUPPORT
Melville G. W. Thatcher, Jr., P.O. Box 128,
Collegedale, Tenn.
Filed Dec. 5, 1963, Ser. No. 328,403
12 Claims. (Cl. 182—27)

This invention comprises to novel and useful extensible ladder and support and more particularly pertains to a readily extensible and foldable support structure of the pivoted linkage type and employing a pair of lazy tong link assemblies disposed in side-by-side relation and connected to each other.

It is the primary purpose of this invention to provide a support structure making use of a lazy tong linkage arrangement which will provide a secure and sturdy support for various purposes in an extended position of the lazy tong linkage arrangement and yet may be compactly folded into a minimum volume of space for transportation and storage.

It is a further important object of the invention to provide an extensible support structure in accordance with the preceding object which when stood on end well function as an extensible ladder of a fixed length and when disposed upon its side will function as a vertically and longitudinally adjustable support structure ideally adapted to support a platform thereon for forming tables, shelves, scaffolds, bridge constructions and the like.

A further object of the invention is to provide an extensible support structure in accordance with the preceding objects which shall be ideally adapted for ready portability so that a single person may readily transport the device, extend it into its operative position and readily fold it into its retracted position with a minimum expenditure of labor and time.

A still further object of the invention is to provide a device in accordance with the foregoing objects which shall have an extremely sturdy and greatly improved interchangeable rung or cross member construction between the two side assemblies of the device to thereby provide a support structure readily convertible to specifically adapt it to various specialized uses.

Yet another and more specific object of the invention is to provide an extensible support structure according to the above set forth objects which shall include a superior and highly advantageous cross member or rung construction of a readily assembled strong, dependable and durable construction and which may be detachably but securely connected to the side members of the device in a variety of advantageous fastening arrangements.

An additional important object of the invention is to provide an extensible support structure of the ladder-like type having improved means for quickly but securely locking and retaining the device in its extended position and if desired, may be employed for retaining the device in its folded or retracted position.

Still another important object of the invention is to provide an extensible support structure in accordance with the foregoing objects which when the device is employed as a scaffold type structure shall include improved and highly effective means for locking the device in vertically and horizontally adjusted positions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view showing the extensible frame of this invention in its extended position and functioning as a ladder-like device;

FIGURE 2 is a fragmentary front elevational view of the lower portion of the arrangement of FIGURE 1, upon an enlarged scale;

FIGURE 3 is a view in vertical central section taken substantially upon the plane indicated by the section line 3—3 of FIGURE 2;

FIGURE 4 is a side elevational view of the apparatus of FIGURE 1 in its compact folded position for portability or storage;

FIGURE 5 is a horizontal sectional view taken substantially upon the plane indicated by the section line 5—5 of FIGURE 4 of the device in folded position;

FIGURE 6 is a view in vertical transverse section taken upon and enlarged scale and substantially upon the plane indicated by section line 6—6 of FIGURE 5 of the device in its folded position;

FIGURE 7 is an enlarged detail view in vertical transverse section of a first form of a cross member or rung mounting means employing a through-bolt fastener;

FIGURE 8 is a view in vertical transverse section, taken substantially upon the plane indicated by the section line 8—8 of FIGURE 7;

FIGURE 9 is a view similar to FIGURE 7 but of a second form of cross member or rung mounting means employing a self-tapping metal screw fastener;

FIGURE 10 is a view in vertical transverse section taken substantially upon the plane indicated by section line 10—10 of FIGURE 9;

FIGURE 11 is a detail view similar to FIGURE 8 but of a third form of rung or cross member mounting, similar to the showing of FIGURE 10 and being taken upon an enlarged scale substantially upon the plane indicated by the section line 11—11 of FIGURE 9;

FIGURE 12 is a view similar to FIGURE 7 but of a fourth form of rung or cross member mounting means employing self-tapping metal screw fastensrs;

FIGURE 13 is a fragmentary exploded perspective view of the rung or cross member and the associated link of a side rail assembly;

FIGURE 14 is an enlarged detail view in vertical transverse section of the locking means when the extensible support structure is employed as a ladder or ladder-like device, being taken substantially upon the plane indicated by the section line 14—14 of FIGURE 2;

FIGURE 15 is a detail view in horizontal section taken substantially upon the plane indicated by section line 15—15 of FIGURE 14 and showing the locking device in the position for locking the support structure in its extended position;

FIGURE 16 is a fragmentary detail perspective view of the lock member of FIGURES 14 and 15 and its mounting upon the associated link of the extensible support structure of the invention;

FIGURE 17 is an enlarged end view of the cross-member or rung of the embodiments of FIGURES 7–13 with its tread and base components in their assembled relation and with the fasteners omitted therefrom;

FIGURE 18 is a side elevational view of the extensible support structure disposed upon its side and employed as an adjustable height base for scaffold or other platform assembly;

FIGURE 19 is a fragmentary perspective view of the extensible lazy tong linkage of the support structure shown in FIGURE 18;

FIGURE 20 is a perspective view, in a partially folded position, of the scaffold or platform member employed in the arrangement of FIGURE 18;

FIGURE 21 is a perspective view of the locking means employed in the arrangement of FIGURE 18; and FIGURE 22 is a diagrammatic view in elevation illustrating the manner in which the extensible framework is lengthened or shortened by varying the number of sections therein.

In its broader and basic aspects, this invention constitutes an extensible support structure of the lazy tong type which is of general application wherever extensible and contractible supports are of utility. In order to illustrate preferred manners of practicing the principles of this invention the drawings illustrate the extensible support structure employed as a ladder or a ladder-like device as shown in FIGURES 1 and 2, and as a scaffold, platform, shelf, table, bridge or the like wherein the extensible support constitutes a supporting framework for a platform or other member when the extensible framework is laid upon its side. However, the actual construction of this extensible supporting framework is identical for either of these two illustrative types of use, except for certain additive features which are incorporated into the device in order to adapt it to certain particular uses or applications. What may be termed the ladder-type of construction is illustrated particularly in its extended and folded positions in FIGURES 1–6, while the use of the device as a scaffold and the like is illustrated in FIGURES 18–20. The securing means peculiar to the ladder-type of construction while maintaining it in its extended position for use has been shown particularly in FIGURES 14–16, while the platform element and the associated securing means forming an important accessory for the device when employed as a scaffold has been illustrated in FIGURES 20 and 21. The detail views of FIGURES 7–13 and 17 relate to the novel cross member or rung construction which is common to the basic extensible support structure regardless of its type of use.

Attention is now directed first to the illustrated use of the extensible support structure in a ladder-like device. As shown in FIGURE 1, the support structure is shown in its extended position to form a ladder-like device indicated generally by the numeral 10. The ladder consists of a series of interconnected links together with cross members or rungs which are assembled to form the ladder shown in extended position in FIGURE 1 and in its folded position in FIGURES 4–6.

Referring now especially to FIGURE 2 it will be observed that the device 10 includes a pair of lazy tong link assemblies each indicated by the numeral 12 and which are of identical but reverse construction being disposed in a parallel side-by-side relation. The two link assemblies 12 each constituting a supporting leg or side rail of the ladder-like device are connected together in rigid spaced relation by means of cross members or rungs 14 in a manner to be subsequently set forth.

Reference is now made especially to FIGURES 1–6 together with FIGURES 18 and 19 for an understanding of the lazy tong construction of the parallel link assemblies 12, and of the cross members or rungs 14 associated therewith. Referring especially to FIGURES 18 and 19, it is to be understood that each of the link assemblies 12 consists of a series of parallel links of identical construction including end links 16 and 18 together with a plurality of intermediate links 20 disposed therebetween. These links are in parallel relation to each other and are each provided with three pivot connections. Brace links or braces extend across and are pivotally connected to the links 16, 18 and 20 at these pivoted connections. Thus there are provided intermediate brace links as at 22 together with a short and medium length of end brace links as at 24 and 26 respectively at each end of the device. As illustrated in the drawings it is thus evident that the lazy tong arrangement of each leg assembly may be pivoted from the various interconnected pivots shown at 28 so that the device may be longitudinally extended as shown in FIGURES 1 and 2 to provide the extended ladder or may be collapsed into the folded or stored position of FIGURES 4 and 5 wherein the links are folded tight upon each other in side-by-side engagement with a minimum clearance therebetween. As will be apparent from FIGURE 4, in the folded position, the maximum height or longitudinal extent of the assembly is equal to the length of one of the links itself. Obviously any desired number of links and braces may be employed to produce a ladder-like device of any predetermined length. Although the device is intended to be of a fixed extended length, this may obviously be varied either initially in accordance with demand or as occasion may require during use by merely disconnecting appropriate pivots and withdrawing or adding additional links as may be desired.

As previously mentioned, the rungs or cross members 14 are connected to the links of the two link assemblies for rigidly interconnecting the ladder. For this purpose, a rigid rung or cross member is provided, there being one such member for each link and with this member being disposed at the upper two-thirds of the link. The cross member is rigidly connected to the associated pair of parallel links in the two opposite leg assemblies 12 by various means which may be alternatively or interchangeably employed as may be desired and as illustrated in FIGURES 7–13.

As previously mentioned, all of the links and braces are of identical construction except that the two end braces 24 and 26 are of shorter length. Each of these links, whether braces or links, is preferably of a channel-like configuration such as is best shown in FIGURES 13 and 17. Here, the numeral 30 is used to denote generally one of the channel members regardless of whether it functions as a brace link or as an intermediate or end link. The channel member includes a flat web 32 having a pair of side walls 34 defining the channel therebetween. These side walls at their outer ends are preferably provided with inturned lips as at 36 which lips, as shown in FIGURE 15, are undercut as at 38 to provide a dovetailed shaped channel therebetween. Opposite the lips 36, the web 32 is provided with very slightly projecting marginal ribs or side walls as at 40 defining a second channel therebetween. There are thus provided two longitudinally extending open ended channels on the opposed faces of each of the members 30 regardless of whether they constitute braces or links. The channel lying between the walls 34 is of much greater depth than the channel lying between the ribs 40, since this latter channel is of very slight depth as of the order of about one-fourth of an inch.

When the I-beam type of channel member 30 is employed as a link, it is provided with a series of openings therethrough, these consisting of the openings 42, three of which are shown disposed in triangular configuration in FIGURE 13, and which consist of slots of rectangular cross-section together with a circular opening or aperture as at 44 disposed therebetween. These openings comprise means whereby the rungs or cross members 14 may be securely mounted upon the links for rigidly interconnecting the leg assemblies to form a ladder.

Attention is now directed specifically to FIGURES 13 and 17 for an understanding of the cross member or rung construction. Each rung is hollow and consists of two separable components including a V-shaped trough-like body member 48 and a plate-like cover member 50 therefor. The body member includes a pair of plate-like planar side walls 52 having their apex disposed downward and with the side walls upwardly divergent and terminating in laterally outwardly projecting longitudinally extending ribs or flanges 54. The cover member 50 consists of a plate-like element 56 having its opposite longitudinal edges downwardly curving and provided with inturned flanges as at 58. The flanges underlie the body of the cover member 56 to provide longitudinally extending channels as at 60 which slidingly receive and retain therein the flanges 54 of the body member 48 in the manner shown in FIGURE 17 and also in FIGURES 7, 9 and 12.

All or any desired portion of the upper and exterior surface of the cover member 50 is provided with serrations as at 62 to provide a non-slipping surface when the crossmember functions as a rung of a ladder or the like.

Extending longitudinally of the cover member 50 and depending therefrom and disposed medially thereof are a pair of opposed L-shaped flanges or ribs each indicated by the numeral 62 and defining a box-like channel 64 therebetween of rectangular cross-section, with the flanges 62 having their ends inturned and spaced to provide a longitudinally slot or opening 66 therebetween. Further pairs of cooperating ribs are provided consisting of three pairs of ribs each provided at one of the corners of the triangular shaped cross-member upon the interior thereof. Thus, there are provided a pair of longitudinally extending ribs as at 68 which depend from the cover member 50 together with a pair of ribs 70 upon the side walls 52 of the body member and which cooperate with the ribs 68 to define a channel therebetween as at 72 and a slot or opening into this channel as at 74. A further pair of longitudinally extending ribs 76 are disposed upon the side walls of the body member adjacent the bottom apex thereof, defining a channel 78 therebetween together with a slot or opening 80.

Each of the pairs of cooperating ribs 62, or the triangularly disposed ribs may be selectively utilized as a part of a mounting means by which the cross members are secured to the links of the side assemblies. A variety of fastening means or members may be interchangeably utilized in conjunction with the mounting ribs, certain of these arrangements being illustrated in FIGURES 7, 8; 9, 10; 11, and 12.

In addition to the internal ribs, the rungs are provided with axially projecting tongues at their opposite ends. Thus, the cover member 50, FIGURE 13, is provided with a pair of projecting tongues as shown at 82, each of which is adapted to be seated in one of the slots 42. Similarly, a projecting tongue 84 on the body member at the bottom apex thereof is removably seated in the slot 42. These three tongues thus seat and support the associated cross member upon the two parallel links at the opposite ends thereof.

In the arrangement shown in FIGURE 11, the tongues may be of sufficient length to have the end portions thereof, passing entirely through the slots 42, bent over to provide retaining flanges as at 86. In that event, no further fastener is necessary to securely attach the cross members to the side assemblies.

However, in many instances a much sturdier construction is desired and particularly one which can be readily removed when necessary for the purpose of servicing or replacing the rung or link components of the device.

In the arrangement shown in FIGURES 7 and 8, there is provided a tension member or element in the form of a through-bolt 88 which is received in the channel 64 of the pair of ribs 62 carried by the cover member in a sufficiently loose manner to be readily inserted thereinto. The ends of the through-bolt are diametrically enlarged as at 90 and terminate in fixed or removable heads 92. The enlarged portion 90 extends through the associated end or intermediate links 16, 18 or 20 with which the cross member is associated and the combinaiton of the tension element 88 and the compression member formed by the cross member body and cover members 48 and 50 serves to fixedly and securely connect the two leg assemblies to each other.

In a modified construction shown in FIGURES 9 and 10, in place of the through-bolt 88 there are provided for each cross member a pair of screw threaded fasteners 94 such as self-tapping metal screws likewise having their diametrically enlarged portions 96 for the same purpose as the portions 90 with a headed portion 98. The self-tapping metal screw fasteners 94 are of such size that they may be threaded into the channel 64 and will cut a thread into the two flanges 62 thereof to thus effect a firm and secure locking engagement of the cross member at its opposite ends to the associated pair of links.

In the still further modified construction of FIGURE 12, self-tapping screw fasteners 100 which are identical in construction and operation with the fasteners 94 are employed in each of the three triangular disposed channels 72, 72 and 78 of the cross member construction. As will readily be appreciated, any one or all of these fastening means may be utilized to detachably or fixedly secure the cross members or rungs to the associated parallel links.

The fasteners 88 or 94 will of course pass through the opening 44 of the associated link.

In addition to the cross members or rungs 14, the linkage assembly is provided with other detachable pivotal connections whereby the links and base links may be removably associated with each other. A convenient pivot connection for this puropse, as shown in FIGURES 7, 9, 12 and 14, may conveniently comprise a pivot pin 110 extending through suitable aligned apertures in the associated link and brace links, and which pivot pin has a peripherally extending groove or channel 112 therethrough receiving a horseshoe type of resilient fastening clip 114. By removing clip 114, the pivot pin may be readily withdrawn to permit disconnection of the associated link and link braces. This enables individual links and braces to be removed or added to the assembly as suggested in the view of FIGURE 22 so as to vary the fixed over-all length of a given ladder or ladder-like construction.

Reference is now made particularly to FIGURES 14 and 15 for an understanding of the locking means comprising a securing means by which the linkage of the latter is maintained in an extended or folded position. This lock means comprises a lock member 120 together with a cooperating keeper member 122. Each of these members comprises a plate-like body having shouldered grooves 124 disposed therein which cooperate with the locking channels 38 of the flanges 36 of the associated link element. Rising from the locking member 120 is a lug 125 apertured as at 126 to receive the end 128 of a rectangular bail comprising a connecting means indicated generally by the numeral 130. End 128 constitutes a pivot or hinge received in the aperture 126, the connecting member embracing the projection 125. Journaled upon the other end 132 of the connecting means which constitutes therefor a pivot pin or hinge pin, is an elliptical shaped plate constituting a latch element or latch member 134 centrally apertured as at 136 to receive the hinge or pivot pin 132. As shown best in FIGURE 15, the latch element 134 is provided with pointed ends 140 which are equidistant from the hinge pin 132.

Rising from the keeper member 122 is a lug 142 having a concave recess 144 therein comprising a latch recess into which the pointed and rounded end of the latch element 134 may be received. As shown in FIGURE 15, latch recess is so shaped and the connecting member is so mounted that an over-center relationship is established for the latch element about its hinge pin 132. Referring to FIGURE 15 it will be noted that the tension applied to the latch element by the resilient or spring wire construction of the connecting means 130 is disposed to the inside of the line joining the pivot pin 132 with the point of contact of the latch element with the latching lug 142. However, if the latch element is rotated in a counter-clockwise direction as shown in FIGURE 15, the pivot pin 132 will pass beyond the line of the point of contact of the latch element with the lug 142 and the axis of the hinge pin 128. This will free the locking element.

An important feature of this invention is that the two lock components 120 and 122 are slidably received within the channels of their associated links so that the lock assembly may be readily moved longitudinally thereof to any desired location. When properly positioned, as suggested in FIGURE 16 at 150, the locking components may be fixedly secured in place in their channels by deforming the flange or bead portions 36 thereof as by the use of a dimple punch or the like. Thus, the locks may be readily shifted to a desired location and then secured in place thereby adapting the invention to various particular uses.

In general, it is preferred to locate the lock members, as shown in FIGURE 6 in particular, closely adjacent the next to the top rung or cross member of the device, as indicated generally by the numeral 152 in FIGURE 6. Inasmuch as the next adjacent link or link brace will have its adjacent end portion in overlapping relation, there will thus be obtained the maximum effectiveness of the lock for retaining the device in its fully extended position as shown in FIGURES 1–3.

Alternatively, however, locks may be placed in a position to lock and retain the links in the fully folded position of FIGURE 6.

In the preceding discussion there has been disclosed the manner of applying the principles of this extensible support structure to a ladder-like device. In such usage, the extended support structure is supported at one end in a vertical position. However, it is also equally possible to employ the extensible support structure as a scaffolding or similar type of device by positioning the lazy tong linkage upon its sides as in FIGURE 18. When employed in this manner it is obvious that each of the links as well as the intermediate brace links will function as load bearing members at one end thereof, and as load supporting members at their upper ends. By varying the angular relationship between the links, that is by longitudinally or horizontally extending the assembly, it is evident that the upper ends of the links may be positioned at any desired vertical elevation within the limits of the length of the links to receive thereon a platform, shelf, scaffold or other horizontally extending flat member to be supported thereby indicated generally by the numeral 160. Referring to FIGURE 20 it will be noted that the member 160 may conveniently comprise two or more individual panels as at 162 and 164 having adjacent ends hingedly connected as by a piano type of hinge 166. The scaffold member 160 is utilized as a platform or support surface on the top of the support structure and also as a means to lock and secure the extensible framework in adjustably extended positions. For this purpose, a locking means or securing means of a readily applied and removable nature is utilized. This securing or locking means is indicated generally by the numeral 168. One such locking means is provided adjacent each end of the scaffold 160 although more locking members could be provided if desired. The locking means 168 are longitudinally adjustable upon the member 160 relative to each other.

Each locking means consists of a pair of brackets or locking bars 170 each consisting of a flat shank from which projects a pair of horizontally extending parallel projections such as pegs or pins 172. At one extremity, the shanks are provided with hook elements 174. Depending from the shanks and intermediate the pins 172 are horizontally extending laterally directed brackets 176 which project toward each other in alignment and which are apertured as at 178 to receive the hook extremities of a tension spring 180. Cooperating with the locking devices 168 are series of longitudinally spaced locking recesses or bores 182 disposed in the two opposite side edges of each end of the scaffold 160. In use, each locking member is placed in longitudinally adjusted position upon the scaffold at the opposite ends thereof by inserting the pins 172 of each of the locking members 168 in the selected bores or recesses 182. Thereupon the spring 180 extending beneath the scaffold 160 will yieldingly tension and retain the locks in their engaged position. It will be understood that when the pins 172 are positioned in selected apertures, the hook elements 174 will embrace the adjacent cross members 14 to thereby prevent separation of these members and thus firmly retain the linkage in horizontally adjusted position.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An extensible support structure of the pivoted linkage type comprising a pair of lazy tong link assemblies disposed in side-by-side arrangement and constituting supporting sides for said structure, each assembly comprising end links and a plurality of intermediate links together with brace links pivoted to said ends and intermediate links, cross members extending between and uniting said assemblies, each cross member comprising an elongated hollow body member having an open side and a plate-like cover member therefor, mounting means securing opposite ends of said body member to the associated pair of parallel links, said assemblies being simultaneously movable by pivoting of their links between an elongated extended position functioning as a support structure and a folded position with said links and braces retracted into side-by-side engagement with each other in each assembly, lock means releasably and selectively retaining said side rails in extended and collapsed positions, a pair of adjacent links of each side rail assembly having longitudinally extending channels, said lock means comprising a lock member slidably and adjustably retained in the channel of one of said pair of adjacent links and a keeper member similarly retained in the other, a connector pivoted to one member and releasably engaged with the other member.

2. The combination of claim 1 including a latch plate pivoted upon said connector, said other member having a latch recess receiving said latch plate.

3. The combination of claim 2 wherein said latch recess and the pivot connections of said connector to said latch plate and said one member have an overcenter relation effecting self-locking of said latch plate in said keeper member.

4. An extensible support structure of the pivoted linkage type comprising a pair of lazy tong link assemblies disposed in side-by-side arrangement and constituting supporting sides for said structure, each assembly comprising end links and a plurality of intermediate links together with brace links pivoted to said end and intermediate links, cross members extending between and uniting said assemblies, each cross member being terminally connected to a pair of parallel links each disposed in one of said assemblies, each cross member comprising an elongated hollow body member having an open side and a plate-like cover member therefor, mounting means securing opposite ends of said body member to the associated pair of parallel links, said assemblies being simultaneouly movable by pivoting of their links between an elongated extended position functioning as a support structure and a folded position with said links and braces retracted into side-by-side engagement with each other in each assembly and lock means comprising a lock member and a cooperating keeper member each mounted upon one of a pair of adjacent links, a connecting means pivoted upon said lock member and releasably engaging said keeper member and cooperating with and securing each of said assemblies in an extended and load bearing position, said pair of adjacent links having channels therein, said lock member and cooperating keeper member being each mounted in a channel of the associated link.

5. An extensible support structure of the pivoted linkage type comprising a pair of lazy tong link assemblies disposed in side-by-side arrangement and constituting supporting sides for said structure, each assembly comprising end links and a plurality of intermediate links together with brace links pivoted to said end and intermediate links, cross members extending between and uniting said assemblies, each cross member being terminally connected to a pair of parallel links each disposed in one of said assemblies, each cross member comprising an elongated hollow body member having an open side and a plate-like cover member therefor, mounting means securing opposite ends of said body member to the associated pair of parallel links, said assemblies being simultaneously movable by pivoting of their links between an elongated extended position functioning as a support structure and a folded position with said links and braces retracted into side-by-side engagement with each other in each assembly and means cooperating with and securing said assemblies in an extended and load bearing position, said securing means comprising a lock means comprising a lock member and a cooperating keeper member each mounted upon one of said links and brace links, each of said last mentioned link and brace links having a longitudinal recess in which said lock and keeper members are slidably received, means locking said lock and keeper members in cooperating adjusted position in their respective recesses.

6. The combination of claim 5 wherein each of said links and brace links is a channel member defining said recesses, said keeper member having a keeper recess, said lock member including a latch element having ends reversibly engageable in said keeper recess, a latch connector pivoted to said latch element and said lock member.

7. The combination of claim 6 wherein the pivotal connection of said latch connector and said latch element and lock member is so disposed as to effect an over-center relation of said latch element thereby normally retaining said latch element in latching engagement with said latch recess.

8. The combination of claim 7 including a detent means on said lock member releasably engaging said latch connector and holding said latch element in a position remote from said latch keeper.

9. An extensible support structure of the pivoted linkage type comprising a pair of lazy tong link assemblies disposed in side-by-side arrangement and constituting supporting sides for said structure, each assembly comprising end links and a plurality of intermediate links together with brace links pivoted to said end and intermediate links, cross members extending between and uniting said assemblies, each cross member being terminally connected to a pair of parallel links each disposed in one of said assemblies, each cross member comprising an elongated hollow body member having an open side and a plate-like cover member therefor, mounting means securing opposite ends of said body member to the associated pair of parallel links, said assemblies being simultaneously movable by pivoting of their links between an elongated extended position functioning as a support structure and a folded position with said links and braces retracted into side-by-side engagement with each other in each assembly, and cooperating with and securing said assemblies in an extended and load bearing position, said body member comprising a trough with V-shaped side walls, said cover member and body member side walls having interlocking slidably engaged longitudinally extending ribs and channels.

10. An extensible support structure of the pivoted linkage type comprising a pair of lazy tong link assemblies disposed in side-by-side arrangement and constituting supporting sides for said structure, each assembly comprising end links and a plurality of intermediate links together with brace links pivoted to said end and intermediate links, cross members extending between and uniting said assemblies, each cross member being terminally connected to a pair of parallel links each disposed in one of said assemblies, each cross member comprising an elongated hollow body member having an open side and a plate-like cover member therefor, mounting means securing opposite ends of said body member to the associated pair of parallel links, said assemblies being simultaneously movable by pivoting of their links between an elongated extended position functioning as a support structure and a folded position with said links and braces retracted into side-by-side engagement with each other in each assembly, and cooperating with and securing said assemblies in an extended and load bearing position, a platform detachably mounted upon said link assemblies when said support structure is extended and rests upon its side, said securing means comprising a hook assembly detachably secured to opposite sides of said platform and engageable with spaced cross members and preventing separation of the latter.

11. The combination of claim 10 wherein said platform has a series of longitudinally spaced apertures at each side thereof, said hook assembly comprising a pair of hook members each having projections detachably engaged in selected apertures.

12. The combination of claim 11 including a spring engaging said pair of hook members and yieldingly biasing their projections into said apertures.

References Cited by the Examiner

UNITED STATES PATENTS

| | | | |
|---|---|---|---|
| 2,567,302 | 9/1951 | Sip | 182—157 |
| 2,798,653 | 7/1957 | Morrow | 182—157 |
| 2,915,799 | 12/1959 | Andreasen | 24—270 |
| 3,022,857 | 2/1962 | Rich | 182—228 |

FOREIGN PATENTS

| | | |
|---|---|---|
| 921,383 | 3/1963 | Great Britain. |
| 941,531 | 11/1963 | Great Britain. |

REINALDO P. MACHADO, *Primary Examiner.*

HARRISON R. MOSELEY, *Examiner.*